United States Patent
Thetford et al.

(10) Patent No.: US 10,584,256 B2
(45) Date of Patent: Mar. 10, 2020

(54) POLYESTER DISPERSANTS FOR COLOURATION OF CERAMIC TILES USING INK JET INKS AND INK JET INK PRINTERS

(71) Applicant: Lubrizol Advanced Materials, Inc., Cleveland, OH (US)

(72) Inventors: Dean Thetford, Rochdale (GB); David Cartridge, Bolton (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 343 days.

(21) Appl. No.: 15/529,029

(22) PCT Filed: Nov. 12, 2015

(86) PCT No.: PCT/US2015/060300
§ 371 (c)(1),
(2) Date: May 23, 2017

(87) PCT Pub. No.: WO2016/085663
PCT Pub. Date: Jun. 2, 2016

(65) Prior Publication Data
US 2017/0260409 A1  Sep. 14, 2017

Related U.S. Application Data

(60) Provisional application No. 62/083,500, filed on Nov. 24, 2014.

(51) Int. Cl.
| | | |
|---|---|---|
| *C09D 11/326* | (2014.01) | |
| *C09D 11/104* | (2014.01) | |
| *C09D 11/30* | (2014.01) | |
| *C09D 11/32* | (2014.01) | |
| *C09D 143/00* | (2006.01) | |

(52) U.S. Cl.
CPC .......... *C09D 11/326* (2013.01); *C09D 11/104* (2013.01); *C09D 11/30* (2013.01); *C09D 11/32* (2013.01); *C09D 143/00* (2013.01)

(58) Field of Classification Search
CPC .... C09D 11/326; C09D 11/32; C09D 143/00; C09D 11/30; C09D 11/104

USPC .................................................. 523/160, 161
See application file for complete search history.

(56) References Cited

U.S. PATENT DOCUMENTS

| 5,700,395 A | * | 12/1997 | Thetford | ............... | B01F 17/005 |
|---|---|---|---|---|---|
| | | | | | 516/31 |
| 2013/0312636 A1 | * | 11/2013 | Fornara | ................. | C04B 41/009 |
| | | | | | 106/31.75 |
| 2013/0342593 A1 | * | 12/2013 | Fornara | ................. | C08G 69/44 |
| | | | | | 347/2 |

FOREIGN PATENT DOCUMENTS

| WO | 2012107379 A1 | | 8/2012 |
|---|---|---|---|
| WO | 2012116878 A1 | | 9/2012 |
| WO | WO 2012/116878 | * | 9/2012 |
| WO | 2014146992 A1 | | 9/2014 |

OTHER PUBLICATIONS

Search Report of Corresponding International Application No. PCT/US2015/060300 dated Jan. 18, 2016.
Written Opinion of Corresponding International Application No. PCT/US2015/060300 dated Jan. 18, 2016.
Corresponding PCT Publication No. WO 2016/085663 A1 published Jun. 2, 2016.

* cited by examiner

*Primary Examiner* — Doris L Lee
(74) *Attorney, Agent, or Firm* — Vincent Cortese; Samuel Laferty

(57) ABSTRACT

The invention provides dispersed inorganic mixed metal oxide pigment compositions in a non-aqueous media utilizing a polyester dispersant having a terminal hydroxyl, tertiary amine or quaternized amine anchoring group and a mixed metal oxide pigment. The metal oxide pigment is of the type used to colour ceramic or glass articles. A milling process using beads is also described to reduce the mixed metal oxide particle size to the desired range. A method of using the mixed metal oxide dispersion to digitally print an image on a ceramic or glass article using the dispersion jetted through a nozzle and firing the coloured article is also described.

21 Claims, No Drawings

POLYESTER DISPERSANTS FOR COLOURATION OF CERAMIC TILES USING INK JET INKS AND INK JET INK PRINTERS

CROSS REFERENCE TO RELATED APPLICATION

This application is a national phase entry under 35 U.S.C. 371 of PCT/US2015/060300 filed Nov. 12, 2015, which claims the benefit of U.S. Provisional Application No. 62/083,500 filed Nov. 24, 2014.

FIELD OF INVENTION

The invention provides polyester dispersants and dispersed pigment compositions useful for the colouration of ceramic articles and glass. The dispersed pigments are those of the type that develop their colouration during high temperature ceramic firing of a coating on the ceramic article or glass. The dispersed pigments are desirably suitable for jetting through a nozzle during a digitally controlled printing operation.

BACKGROUND OF THE INVENTION

Civilizations have made a variety of ceramic articles such as cooking and serving vessels, water and other fluid containers, tiles, bricks, etc., for thousands of years. These were typically coloured or decorated with metal oxide type pigments that developed colours or more intense colours during an elevated temperature firing of the pigment and ceramic article. The metal oxide type colouration pigments were thought to chemically interact and interpenetrate and develop colours at high temperatures with the ceramic composition and/or with more glassy compositions sometimes applied with the colouration pigments or subsequently applied. The more glassy compositions were often to provide impermeable or barrier properties to the outer surface of the ceramic article (to protect the ceramic article from environmental materials with which it might come in contact).

With conventional organic pigments and the few inorganic pigments (e.g., $TiO_2$, silica, and talc) in polymeric organic binder, the particle size and particle uniformity are very important to achieve consistent and intense colouration. Inorganic mixed metal oxide pigments used in inorganic ceramic colouration are generally not as well understood as organic pigments. The particle size of the inorganic metal oxide pigments generally has not been studied and controlled to the extent that particle sizes of pigments has been controlled for use in polymeric organic coatings and inks. With interest in converting from older printing technologies such as screen and gravure printing to digitally printing on ceramic articles using ink jet nozzle technology, there is also a need to reduce the particle sizes of inorganic metal oxide pigments and to colloidally stabilize the particles of inorganic metal oxides in ink jet inks to avoid settling of the denser mixed metal oxide pigments and plugging of ink jet nozzles.

U.S. Pat. No. 3,778,287 discloses structures of poly 12-hydroxystearic acids (PHS) and polyricinoleic acids (PRA) and their use in aliphatic/aromatic ink/paint systems as dispersants for organic and inorganic pigments.

U.S. Pat. No. 4,645,611 is directed to finely divided particles of magnetic material in an organic liquid containing a dispersant comprising an amine carrying a poly (carbonylalkyleneoxy) chain (PCAO) in which the alkylene groups of the carbonylalkylene contain up to 8 carbon atoms, or an acid-salt thereof. The dispersion is useful for preparing magnetic recording media.

U.S. Pat. No. 4,861,380 is directed to a composition comprising a particulate non-magnetic solid and a dispersant comprising a poly($C_{2-4}$-alkyleneimine) carrying at least two mono or poly(carbonyl-$C_{1-7}$-alkyenoxy) groups in an organic medium.

U.S. Pat. No. 5,700,395 is directed to a dispersant comprising a polyethyleneimine residue carrying polyester chains derived from a caprolactone and at least one other specified lactone or hydroxycarboxylic acid.

U.S. Pat. No. 6,787,600 is directed to a dispersant which comprises a polyamine (e.g., polyallylamine or polyethyleneimine) with two or more different types of polyester chains (e.g., chains from hydroxycarboxylic acids with $C_{1-8}$-alkylene groups and chains from hydroxycarboxylic acids with $C_{8-30}$-alkylene).

WO2012/107379A1 is directed to a aminic dispersant with poly(oxyalkylenecarbonyl) solubilizing chain and WO2012/116878A1 is directed to ceramic ink for inkjet printers utilizing a dispersant from polyethyleneimine with homo or copolymers based on lactic acid.

WO2014/146992 is directed to inks for inkjet printers prepared by milling a ceramic inorganic pigment in the presence of a dispersing agent which is the reaction product of polyethyleneimine and a co-polyester of 12-hydroxystearic acid and ε-caprolactone.

SUMMARY OF THE INVENTION

It has been found that certain dispersants show excellent ability to disperse inorganic pigments (preferably mixed metal oxide pigments) to produce colloidally stable non-aqueous dispersions, non-aqueous ink jet ink dispersions and final non-aqueous ink jet inks for the colouration of ceramic tiles and glass using ink jet ink printers. Thus, according to the present invention, there is provided a composition comprising a particulate solid, a mid-polar ester medium and/or polar ether medium, and a dispersing agent derived from a polyester polymerization of two or more hydroxyalkylene carboxylic acids or lactones thereof, optionally wherein the carboxylic acid functional end is converted to a tertiary amine or quaternized amine by reacting with a low molecular weight diamine or an alcohol containing said tertiary amine or quaternized tertiary amine. The dispersant can be represented by the Formula (1)

$$RC(=O)\text{-}[A]_m\text{-}[B]_n\text{—}Z \qquad \text{Formula (1)}$$

wherein Formula 1 can be a random or blocky copolymer
R is a $C_{1-35}$ hydrocarbyl group;
A is an oxy ($C_{8-20}$) alk(en)ylene carbonyl repeating unit of a polyester;
B is an optionally substituted oxy ($C_{2-7}$) alkylene carbonyl repeating unit of a polyester;
m is 1-6 and n is 1-10 and m+n is from 4 to 16;
Z is OH or is a group which is attached to the carbonyl group of A or B through an oxygen or nitrogen atom and can be generally represented by the formula:

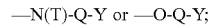

$$\text{—N(T)-Q-Y or —O-Q-Y};$$

wherein T is a hydrogen, or a $C_{1-18}$ hydrocarbyl radical, or a group represented by Q-Y;
Q is an alkylene or hydroxyalkylene radical containing from 2-6 carbon atoms;

and Y is a tertiary amine group represented by the formula:

—N(R²)(R³)

or a quaternary ammonium group represented by the formula:

—N⁺(R²)(R³)(R⁴)W⁻ wherein R², R³ and R⁴ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein R² and R³ can be a single hydrocarbon group that in combination with the N of the Y group forms a cyclic amine (which can be saturated or unsaturated, e.g. alkylene or aromatic); and W⁻ is a colourless anion.

DETAILED DESCRIPTION OF THE INVENTION

The invention relates to the use of a class of dispersants in ceramic ink jet inks formulations, to dispersions containing such dispersants together with a particulate solid (mixed metal oxides) and an organic medium (fatty acid esters and glycol ether/esters), and compositions comprising a particulate solid, an organic medium and a dispersant and to their use in ceramic ink jet inks and millbases. Many formulations such as inks, paints and mill-bases require effective dispersants for uniformly distributing a particulate solid in an organic medium.
The dispersant formula is RC(=O)-[A]$_m$-[B]$_n$—Z                Formula (1)

wherein Formula 1 can be a random or blocky copolymer of A and B units,
R is a $C_{1-35}$ hydrocarbyl group optionally substituted with hydroxyl or halogen;
A is an oxy ($C_{8-20}$) alk(en)ylene carbonyl repeating unit;
B is an optionally substituted oxy ($C_{2-7}$) alkylene carbonyl repeating unit; wherein oxy ($C_{8-20}$) alk(en)ylene carbonyl means the alk(en)ylene group has from 8 to 20 carbon atoms and oxy ($C_{2-7}$) alkylene carbonyl means the alkylene group has 2 to 7 carbon atoms.
m is 1-6 and n is 1-10 and m+n is from 4 to 16;
Z is OH or is a group which is attached to the carbonyl group of A or B through an oxygen or nitrogen atom and can be generally represented by the formula:

—N(T)-Q-Y or —O-Q-Y;

wherein T is a hydrogen, or a $C_{1-18}$ hydrocarbyl radical, or a group represented by Q-Y;
Q is an alkylene or hydroxyalkylene radical containing from 2-6 carbon atoms;
and Y is a tertiary amine group represented by the formula:

—N(R²)(R³)

or a quaternary ammonium group represented by the formula:

—N⁺(R²)(R³)(R⁴)W⁻ wherein R², R³ and R⁴ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein R² and R³ can be a single hydrocarbon group that in combination with the N of the Y group forms a cyclic amine (which can be saturated or unsaturated, e.g. alkylene or aromatic);
and W⁻ is a colourless anion, and wherein the particulate solid is a mixed metal oxide pigment that develops its color intensity and hue after firing at elevated temperatures.

In one embodiment, the molecular weight of R—C(=O)-[A]$_m$-[B]$_n$ or the dispersant of Formula 1 is between 600 and 3000 g/mole.

In one embodiment, an ink comprises a dispersion of a mixed metal oxide in a non-aqueous media. In another embodiment, the ink is in the form of an ink jet ink.

In another embodiment, the ink is in an ink jet printer cartridge comprising a chamber which contains the ink including the mixed metal oxide pigments.

In another embodiment, the ink is of the type to be printed from an ink jet printer of the kind including piezo, thermal, acoustic and electrostatic mechanism to propel the ink from the printhead. Preferably the printer utilized with these inks are of the piezo or electroacoustic drop on demand (DOD) type.

In another embodiment, the ink is printed on a substrate comprising either a ceramic object, e.g., tile or article, or a glass substrate, e.g., pane or article.

Another embodiment is the ink jet ink is printed on a substrate, e.g., ceramic tiles, by single pass inline and glass articles by multi pass off line DOD printers.

The hydroxy carboxylic acid from which A is derivable is preferably hydroxy-$C_{8-20}$-alkenylene carboxylic acid and especially hydroxy-$C_{8-20}$ alkylene carboxylic acid. Specific examples of suitable hydroxy carboxylic acids are ricinoleic acid, 12-hydroxystearic acid, 12-hydroxy dodecanoic acid, 5-hydroxy dodecanoic acid, 5-hydroxy decanoic acid, 4-hydroxy decanoic acid and 10-hydroxy undecanoic acid. Many of the hydroxycarboxylic acids which are used to prepare the polyester chains are available commercially as mixtures which contain a carboxylic acid which is free from hydroxy groups. The carboxylic acid which is free from hydroxy groups can, thereby, act as the polymerisation terminal group, e.g., commercially available 12-hydroxy stearic acid often contains some stearic acid.

The hydroxy carboxylic acid from which B is derivable is preferably hydroxy-$C_{2-7}$-alkylene carboxylic acid or a lactone having 3 to 8 carbon atoms. Specific examples of suitable hydroxy carboxylic acids include lactic acid, 5-hydroxy valeric acid and 6-hydroxy caproic acid. Specific examples of suitable lactones include caprolactone, valerolactone, alkyl substituted caprolactones and valerolactones such as 7-methyl caprolactone and β-methyl-δ-valerolactone.

Typically the R—CO— group of Formula 1 is derived from $C_{1-36}$ fatty acids (preferred $C_{8-20}$) such as oleic, palmitic, stearic, erucic, behenic, lauric, 2-ethylhexanoic, 9,11- and 9,12-linoleic, 9,12,15-linolenic acids, acetic acid, abietic acid, glycolic, lactic, caproic, lauric, oleic, stearic, methoxy acetic, ricinoleic, 12-hydroxy stearic, 12-hydroxy dodecanoic, 5-hydroxy dodecanoic, 5-hydroxy decanoic, 4-hydroxy decanoic, isobutyric, 2-ethylbutyric, isovaleric; 2,2-dimethylbutyric, 2-methylvaleric, 2-propylpentanoic, 2-ethylhexanoic acids and $C_{12-24}$-branched chain aliphatic acids available as Isocarbs from Condea. The polymerisation terminal group R—C(=O)— is preferably free from amino groups and is preferably derived from a $C_{1-36}$-aliphatic carboxylic acid (the OH group of the acid is replaced by a direct bond) which may be linear or branched and is optionally substituted by hydroxy, $C_{1-4}$-alkoxy or halogen (e.g., Cl, Br, or I). The residue R may be saturated or unsaturated and preferably contains not greater than 35 carbon atoms and preferably not greater than 18 carbon atoms.

In one embodiment, it is preferred to prepare the polyester chains separately, prior to reacting them with the suitable amines or amino alcohols (as described later). In this case, the hydroxycarboxylic acids or lactones thereof or blends thereof and polymerisation terminal compound are reacted together in an inert atmosphere at 150-200° C. and preferably in the presence of an esterification catalyst. The subsequent reaction with the amine component (if desired) may then be carried out between 50° C. and 190° C., especially between 80° C. and 180° C., and preferably in an inert solvent. Examples of suitable inert solvents are aromatic and aliphatic solvents such as xylene, toluene and Solvesso™ (available from ExxonMobil Chemical), ketones such as acetone, methylethylketone and methylisobutylketone, alkanols such as n-butanol and isopropanol and esters such as dimethyladipate, dimethyl succinate and dimethylglutarate. The dispersant of this disclosure may be prepared in a one-pot or a multi-pot reaction depending on the reactivity of the components making the dispersant and any desire to control the order of addition of monomers/reactants onto the growing dispersant molecule.

In one embodiment, the dispersants of Formula 1 wherein Z is represented by the formula —N(T)-Q-Y or —O-Q-Y can be prepared in one pot by polymerisation of the hydroxy alkylene carboxylic acids/lactones in the presence of the amines represented by H—N(T)-Q-Y or H—O-Q-Y preferably in the presence of the esterification catalysts at a temperature between 150° and 180° C. under an inert atmosphere such as nitrogen.

In one embodiment, the dispersants represented by Formula 1 can be a mixture wherein Z can be a mixture including two or more of —OH, —N(T)-Q-Y and —O-Q-Y and Y can be a mixture of tertiary amine or quaternised tertiary amine group.

Examples of suitable amines represented by H—N(T)-Q-Y that can react with the carboxylic acid group of the polyester to form the —N(T)-Q-Y group include N,N-dimethyl-aminopropylamine, N,N-diethyl-aminopropylamine, N,N-dimethyl-aminoethylamine, N,N-diethyl aminoethylamine, 1-aminopiperidine, 1-(2-aminoethyl)piperidine, 1-(3-aminopropyl)-2-pipecoline, 1-methyl-(4-methylamino) piperidine, 4-(1-pyrrolidinyl)piperidine, 1-(2-aminoethyl) pyrrolidine, 2-(2-aminoethyl)-1-methyl pyrrolidine, 3-aminoprylimidazole N,N-dibutylethylenediamine, N,N, N'-trimethylethylenediamine, N,N-dimethyl-N'-ethylethylenediamine, N,N-diethyl-N'-methylethylenediamine, N,N, N'-triethylethylenediamine, 3-dibutylaminopropylamine, N,N,N'-trimethyl-1,3-propanediamine, 2-amino-5-diethylaminopentane, N,N,N',N'-tetraethyldiethylenetriamine, 3,3'-diamino-N-methyldipropyl amine, 3,3'-iminobis(N,N-dimethylpropylamine), 4-(3-aminopropyl)morpholine, or mixtures thereof.

Examples of suitable amino alcohols represented by H—O-Q-Y (where Q has from 2 to 6 carbon atoms and Y is as defined with Formula 1) that can react with the terminal carboxyl group of the polyester to form —O-Q-Y include dimethylaminoethanol, diethylaminoethanol, dibutylaminoethanol, dimethylaminopropanol, triethanolamine, N,N-diethylaminopropanol, N,N-diethylaminobutanol, triisopropanolamine, 1-[2-hydroxyethyl]piperidine, 2-[2-(dimethylamine)ethoxy]-ethanol, N-ethyldiethanolamine, N-methyldiethanolamine, N-butyldiethanolamine, 2-dimethylamino-2-methyl-1-propanol, or mixtures thereof.

Examples of the radicals represented by Q include ethylene, propylene, tetramethylene, hexamethylene and 2-hydroxytrimethylene.

Examples of the radicals represented by $R^2$, $R^3$ and $R^4$ include alkyl such as methyl, ethyl, n-propyl, n-butyl, hexyl, octyl and octadecyl, hydroxyl lower alkyl such as 2-hydroxyethyl, benzyl and cyclohexyl.

Examples of acids to form salts with the amine group or which contain the anion $W^-$ can be any inorganic acid or colourless organic acid, such as hydrochloric acid, sulphuric acid, acetic acid, propionic acid, formic acid, methanesulphonic acid, benzenesulphonic acid, p-toluenesulphonic acid, benzoic acid.

In one embodiment, the compound of Formula 1 is in the form quaternary amine salt. The substituted ammonium group can be prepared by reaction of the optionally substituted amine with a quaternising agent. Examples of quaternising agents include dialkyl sulphates such as dimethyl sulphate, sultones such as propane and butane sultone, N-oxides, alkyl or araalkyl halides such as methyl and ethyl chloride or benzyl chloride, and alkyl carbonates such as dimethyl or diethyl carbonate and dimethyl oxalate. The ammonium group can be partially or completely quaternized. If partially quaternized, the extent of quaternization can vary from 5 to 95 mole percent of the tertiary amines, more desirably from about 20 to 80 mole percent, and preferably from 30 to 70 mole percent.

The particulate solids are mixed metal oxides used in the colouration of ceramic tiles. A particular highlight includes the dispersion of metal contaminants present within the coloured mixed metal oxide inorganic pigments to produce a more homogeneous colour shade pattern free from streaks and striations caused by metal impurities and providing a much brighter shade.

The invention relates to the use of a class of dispersants in ceramic ink jet inks formulations, to dispersions containing such dispersants together with a particulate solid (mixed metal oxides) and an organic medium (fatty acid esters or glycol ethers), and compositions comprising a particulate solid, an organic medium and a dispersant and to their use in ceramic ink jet inks and millbases. Many formulations such as inks, paints and mill-bases require effective dispersants for uniformly stabilising a particulate solid in an organic medium.

Coloration of ceramic tiles by ink jet inks is a rapidly growing technology and providing stable ink jet ink dispersions of mixed metal oxides with $D_{50}$ particle sizes below 700 nm in various mid-polar ester medium and/or polar ether medium within a short milling time has been problematic.

Using polyester as the dispersant chain has provided stable ink jet ink dispersions containing mixed metal oxides with low particle sizes in a much reduced milling time, better filterability of the dispersions leading to increased millbase yield and reduction of waste, much brighter shades and better dispersion of metal impurities found in the mixed metal oxides. They are also lower cost than current dispersants.

According to the present invention there is provided a composition comprising a particulate solid, an organic medium (fatty acid esters and glycol ether/esters), and a dispersing agent of the Formula 1 used as or in part as an ink jet ink for the coloration of ceramic tiles using an ink jet ink printer.

The particulate solids can be mixed metal oxides or mixtures thereof, which may contain undesired metal present as contaminants and/or as impurities from the milling process.

Mid-polar ester media includes fatty acid esters or combinations thereof. Polar ether media includes glycol ethers.

Claimed advantages would be reduced milling time, better dispersion of metal impurities and/or contaminants leading to homogeneous coloured shades, brighter shades, better particle size stability during storage, improved filterability and increased dispersion/ink yield, reduced syneresis and phase separation.

A preferred particulate solid is mixed metal oxides used in the colouration of ceramic tiles and glass. For the purposes of this invention, mixed metal oxides is interpreted as the solid containing at least two different metals in the same or different oxidation states. A particular improvement from using the dispersants of this disclosure includes the reduction of metal contaminants derived from abrasive wear of the milling equipment as the particular mixed metal oxides are hard to mill and require hard ceramic beads to mill these pigments. The dispersants of this disclosure tend to shorten the milling time required to meet a desirable particle size. When the total milling time on bead mills using hard ceramic beads is reduced, the amount of abrasive wear on both the beads and the internal components of the mill is generally reduced. Reducing the abrasive wear means less metal contaminants from the internal parts of the mill and the beads are introduced into the milled product. While metal contaminants are usually low in color in most pigment binder based coatings, metal contaminants can drastically affect color shade and color intensity in mixed metal oxides fired above 600° C. for colouring ceramic articles and glass.

This disclosure also provides for a method of milling a metal oxide pigment having an initial volume average particle diameter in excess of 2 micron in a mid-polar ester medium and/or polar ether medium to an average particle size of less than 700 nanometres, said process comprising;

a) blending a mid-polar ester medium and/or polar ether medium, a mixed metal oxide pigment, optionally including a vitreous glaze material, having a 50% volume average particle diameter in excess of 2 micron, and a dispersing agent of the formula $$RC(=O)\text{-}[A]_m\text{-}[B]_n\text{—}Z \qquad \text{Formula (1)}$$

wherein Formula 1 can be a random or blocky copolymer of A and B units,

R is a $C_{1-35}$ hydrocarbyl group optionally substituted with hydroxyl or halogen;
A is an oxy $(C_{8-20})$ alk(en)ylene carbonyl repeating unit;
B is an optionally substituted oxy $(C_{2-7})$ alkylene carbonyl repeating unit;
m is 1-6 and n is 1-10 and m+n is from 4 to 16;
Z is OH or is a group which is attached to the carbonyl group of A or B through an oxygen or nitrogen atom and can be generally represented by the formula:

$$-N(T)\text{-}Q\text{-}Y \text{ or } -O\text{-}Q\text{-}Y;$$

wherein T is a hydrogen, or a $C_{1-18}$ hydrocarbyl radical, or a group represented by Q-Y;
Q is an alkylene or hydroxyalkylene radical containing from 2-6 carbon atoms;
and Y is a tertiary amine group represented by the formula:

$$-N(R^2)(R^3)$$

or a quaternary ammonium group represented by the formula:

$$-N^+(R^2)(R^3)(R^4)W^-$$

wherein $R^2$, $R^3$ and $R^4$ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein $R^2$ and $R^3$ can be a single hydrocarbon group that in combination with the N of the Y group forms a cyclic amine (which can be saturated or unsaturated, e.g. alkylene or aromatic);
and $W^-$ is a colourless anion, and wherein the particulate solid is a mixed metal oxide pigment that develops its color intensity and hue after firing at elevated temperatures;

(b) milling said mixed metal oxide pigment dispersed with said dispersing agent in said mid-polar ester medium and/or polar ether medium such as using a bead mill at a milling rate of 0.4 to 8 KWatt/hour per Kg of particulate or 5 mins to 60 hours milling time; and (c) confirming the average particle diameter of 50% volume of the particles is less than 700 nanometres. In one embodiment, the particulate material can have a dry powder volume average particle diameter $D_{50}$ in excess of 2 micrometer at the start of the milling process.

This disclosure also provides a process for digitally printing on ceramic articles or glass articles using an ink jetted through a nozzle; by a) providing a mixed metal oxide pigment dispersed in a mid-polar ester medium and/or polar ether medium with a dispersing agent of the formula $$RC(=O)\text{-}[A]_m\text{-}[B]_n\text{—}Z \qquad \text{Formula (1)}$$

wherein Formula 1 can be a random or blocky copolymer of A and B units,

R is a $C_{1-35}$ hydrocarbyl group optionally substituted with hydroxyl or halogen;
A is an oxy $(C_{8-20})$ alk(en)ylene carbonyl repeating unit;
B is an optionally substituted oxy $(C_{2-7})$ alkylene carbonyl repeating unit;
m is 1-6 and n is 1-10 and m+n is from 4 to 16;
Z is OH or is a group which is attached to the carbonyl group of A or B through an oxygen or nitrogen atom and can be generally represented by the formula:

$$-N(T)\text{-}Q\text{-}Y \text{ or } -O\text{-}Q\text{-}Y;$$

wherein T is a hydrogen, or a $C_{1-18}$ hydrocarbyl radical, or a group represented by Q-Y;
Q is an alkylene or hydroxyalkylene radical containing from 2-6 carbon atoms;
and Y is a tertiary amine group represented by the formula:

$$-N(R^2)(R^3)$$

or a quaternary ammonium group represented by the formula:

$$-N^+(R^2)(R^3)(R^4)W^-$$

wherein $R^2$, $R^3$ and $R^4$ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein $R^2$ and $R^3$ can be a single hydrocarbon group that in combination with the N of the Y group forms a cyclic amine (which can be saturated or unsaturated, e.g. alkylene or aromatic);

and W⁻ is a colourless anion, and wherein the particulate solid is a mixed metal oxide pigment that develops its color intensity and hue after firing at elevated temperatures;

b) jetting said mixed metal oxide dispersed in said mid-polar ester medium and/or polar ether medium using said dispersing agent according to a digital image to form an image on a substrate (optionally on a pre-glaze layers on a ceramic surface) that develops color intensity on said ceramic or glass article during firing;

c) optionally applying a glaze over said digital image; and d) firing said ceramic article at a temperature above 600° C. or tempering or annealing said glass article at a temperature above 400° C. to cause said mixed metal oxide to develop its color. The pre-glaze layer can be applied using traditional methods such as a curtain coater or spray coater. Alternatively the pre-glaze layer could be applied using ink jet printer technology. Said pre-glaze layer above can be a single pre-glaze layer or multi pre-glaze layers. A pre-glaze layer is usually applied to help smooth the surface of a ceramic substrate and optionally adds components to the surface of the ceramic or glaze to optimize properties of the finished ceramic article. The pre-glaze layer(s) can include colorants.

It has been found that certain dispersants show excellent ability to disperse inorganic pigments (particularly those mixed metal oxides) to produce colloidally stable non-aqueous dispersions, non-aqueous ink jet ink dispersions and final non-aqueous ink jet inks for the colouration of ceramic tiles or glass using ink jet ink printers. Thus, according to the present invention, there is provided an ink jet ink composition comprising a mixed metal oxide particulate solid, a mid-polar ester medium and/or polar ether medium and a dispersing agent of Formula 1.

Industrial Application

Coloration of ceramic tiles by ink jet ink technology is a rapidly growing application due to the variety and quality of images available for digital printing via ink jet inks. The particle size of the mixed metal oxides used in older printing processes for ceramic articles and tiles were often too large to easily pass through the nozzles of most ink jet printers. Providing colloidally stable ink jet ink dispersions of mixed metal oxides with $D_{50}$ particle sizes below 700 nm in various mid-polar ester medium and/or polar ether medium within a short milling time has been problematic.

In one embodiment, the compound of Formula 1 is a dispersant for mixed metal oxide pigments of the type used to colour ceramic articles such as ceramic tiles or glass where the pigments are going to be exposed to firing at 600° C. and above to cause the pigments to go from a low intensity colour to an intense permanent color.

The particulate solid present in the composition may be any inorganic solid material (such as a pigment or glaze forming compound which is substantially insoluble in the organic medium) and which after firing at elevated temperatures provides a desirable color. In one embodiment, the particulate solid is a pigment. In another embodiment, the particulate solid is or includes an aluminium or silica rich compound that helps form the glaze compound.

In one embodiment, the ink composition of the invention provides improved jetting efficiency, reduce nozzle plugging, reduced settling, and more consistent jetting in applications where a mixed metal oxide pigment is jetted onto a ceramic article, such as a ceramic tile, or on glass, in accordance with a digital image. In this application the use of the dispersants of this disclosure result in low concentrations of metal and metal oxide wear contaminants from the milling equipment and beads/balls. In one embodiment, the composition provided lower pigment particle size, better colloidal stability, lower amounts of entrained metal from the internal mill surfaces and beads.

Preferred pigments for colouration of ceramic objects or glass are Pigment Yellow 159 (Zr—Si—Pr, zircon praseodymium yellow or praseodymium yellow zircon) such as BASF Sicocer® F Yellow 2200; Pigment Red 232 (Zr—Si—Fe zircon) such as BASF Sicocer® F Coral 2300; Pigment Red 233 (Ca—Sn—Si—Cr, chrome tin pink sphene); Pigment Brown 33 (Zn—Fe—Cr, Spinel) such as BASF Sicocer® Brown 2700; Pigment Blue 72 (Co—Al—Cr, Cobalt Spinel blue); Pigment Blue 28 (Co—Al spinel) such as BASF Sicocer® Blue 2501; Pigment Blue 36 (Co—Al spinel) such as BASF Sicocer® Cyan2500; Pigment Black 27 (Co—Mn—Fe—Cr spinel) such as BASF Sicocer® Black 2900; and Pigment White 12 (Zr—Si) such as BASF Sicocer® White EDT/AK-4409/2.

The organic liquid of the invention may be a mid-polar ester medium and/or polar ether medium. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Polar organic liquids generally have a dielectric constant of 5 or more as defined in the abovementioned article. Non-polar liquids typically have a dielectric constant of less than 5.

Numerous specific examples of such moderately strong hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, the preferred solvents used in the dispersion of the ceramic mixed metal oxides with the dispersants of Formula 1 include octyl octanoate, 2-ethylhexyl-stearate, di-octyl adipate, isopropyl laurate, ethylhexyl cocoate, propylene glycol dicaprylate, tripropylene glycol methyl ether, dipropylene glycol (methyl ether), dipropylene glycol (n-butyl ether), tripropylene glycol (n-butyl ether), isopropyl bisphenols such as 2,2-bis(4-hydroxy-3-isopropyl-phenyl)propane, isopropyl myristate, isopropyl palmitate, isopropyl stearate, isocetyl laurate, isocetyl stearate, ethylhexyl palmitate, or mixtures thereof.

The organic liquid, optionally, further contains less than 5, more desirably less than 2, and preferably less than 1 wt. % of water based on the weight of the dispersion in the media. In one embodiment, the organic liquid is free of water.

If desired, the compositions may contain other optional ingredients, for example, resins (where these do not already constitute the organic medium), binders, fluidizing agents, anti-sedimentation agents, plasticizers, surfactants, antifoamers, rheology modifiers, levelling agents, gloss modifiers and preservatives.

The compositions typically contain from 1 to 85% by weight of the particulate solid, the precise quantity depending on the nature of the solid and the relative densities of the solid and the a mid-polar ester medium and/or polar ether medium. For example, a composition in which the solid is an inorganic material, such as an inorganic pigment, filler or extender, in one embodiment contains from 30 to 90% by weight of the solid based on the total weight of composition.

The composition may be prepared by any of the conventional methods known for preparing dispersions for colouration of ceramic articles fired above 600° C. or for glasses annealed or tempered above 400° C. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. It is anticipated that a variety of particle size and dispersing equipment can be used sequentially to minimize total milling time and expense, such that a large particle size pigment can be dispersed in a continuous media with the dispersant, an initial pre-mix or pre-mill grinding to a desired particle size range, and then transfer to a bead type mill to further break down particulate particles into the $D_{50}$ 200-700 nanometre diameter (by volume average particle size measurements).

A process for milling a mixed metal oxide pigment having a volume average particle diameter in excess of 2 micron in a mid-polar ester medium and/or polar ether medium to a particle size of less 700 nanometres, said process comprising;

a) blending a mid-polar ester medium and/or polar ether medium, a mixed metal oxide pigment having a volume average particle diameter in excess of 2 micron, an a dispersing agent of the formula $$RC(=O)\text{-}[A]_m\text{-}[B]_n\text{—}Z \qquad \text{Formula (1)}$$

wherein Formula 1 can be a random or blocky copolymer of A and B units,

R is a $C_{1-35}$ hydrocarbyl group optionally substituted with hydroxyl or halogen;
A is an oxy ($C_{8-20}$) alk(en)ylene carbonyl repeating unit;
B is an optionally substituted oxy ($C_{2-7}$) alkylene carbonyl repeating unit;
m is 1-6 and n is 1-10 and m+n is from 4 to 16;
Z is OH or is a group which is attached to the carbonyl group of A or B through an oxygen or nitrogen atom and can be generally represented by the formula:

—N(T)-Q-Y or —O-Q-Y;

wherein T is a hydrogen, or a $C_{1-18}$ hydrocarbyl radical, or a group represented by Q-Y;
Q is an alkylene or hydroxyalkylene radical containing from 2-6 carbon atoms;
and Y is a tertiary amine group represented by the formula:

—N($R^2$)($R^3$)

or a quaternary ammonium group represented by the formula:

—N⁺($R^2$)($R^3$)($R^4$)W⁻ wherein $R^2$, $R^3$ and $R^4$ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein $R^2$ and $R^3$ can be a single hydrocarbon group that in combination with the N of the Y group forms a cyclic amine (which can be saturated or unsaturated, e.g. alkylene or aromatic); and W⁻ is a colourless anion, and wherein the particulate solid is a mixed metal oxide pigment that develops its color intensity and hue after firing at elevated temperatures;

b) milling said mixed metal oxide pigment dispersed with said dispersing agent in said mid-polar ester medium and/or polar ether medium such as using a bead mill at a milling rate of 0.4 to 8 KWatt/hour per Kg of particulate or for 5 minutes to 60 hours milling time, and c) confirming the volume average particle diameter $D_{50}$ is less than 700 nanometres.

In one embodiment, the beads used to mill the mixed metal oxide pigments are a ceramic bead rather than a metal bead. In further embodiments using ceramic beads, it is desirable that the ceramic beads are zirconium dioxide, yttrium stabilized zirconia, and/or silicon carbide. The beads are often 0.3 to 0.4 mm in diameter. The mills are often horizontal bead mills and a popular supplier of the mills is Netzsch. The milling often targets a medium value of the particle size distribution where a volume average particle diameter of $D_{50}$ of 300 nm or less and a $D_{90}$ of 500 nm or less is achieved. A $D_{50}$ of 300 nm is a value in which 50% of the particles present in a particle size distribution have diameters greater than 300 nm and 50% have diameters below 300 nm. Milling times are from about 5 minutes to 60 hours, and more desirably from about 5 minutes to 48 hours. In one embodiment, the energy used by the mill over the time period disclosed above ranges from 0.4 to 8 KWatt/hour per Kg of particulate produced to give $D_{50}$ particles in the range disclosed above. The mills may use some classification methods to separate smaller particles from larger particles and then mill the different sized particles to different extents. Solvent may be added during milling to control viscosity, solids contents, etc. Dispersant may be added sequentially or continuously during milling as milling increases the surface area of a gram of pigment and it reduces its $D_{50}$ average particle size from in excess of 2 micron to less than 700, 600, 500, or 300 nanometre.

While not wishing to be bound by theory, it is hypothesized that some dispersants are more effective at getting to newly created surfaces during milling and stabilizing the new surfaces of fractured particles against aggregation into larger particles. Some dispersants are better anchored to particulates and better colloidally stabilize the particles during high energy mixing against agglomeration into larger sized aggregates.

The composition of the present invention is particularly suited to liquid dispersions. In one embodiment, such dispersion compositions comprise:

(a) 0.5 to 60 parts of a particulate solid;
(b) 0.5 to 30 parts of a compound of $RC(=O)\text{-}[A]_m\text{-}[B]_n\text{—}Z$; and
(c) 10 to 99 parts of an organic liquid; wherein all parts are by weight and the amounts (a)+(b)+(c)=100.

In one embodiment, the dispersants of formula $RC(=O)\text{-}[A]_m\text{-}[B]_n\text{—}Z$ can be used to make self dispersable or re-dispersable pigment concentrates for colouring ceramic articles. In this embodiment a continuous media that can be evaporated off or removed by centrifugation can be used to conduct the milling and then the pigment with dispersant thereon can be concentrated, stored, shipped etc., until needed in dispersion form. If a composition is required comprising a particulate solid and a dispersant of formula $RC(=O)\text{-}[A]_m\text{-}[B]_n\text{—}Z$ in dry form, the organic liquid is typically volatile so that it may be readily removed from the particulate solid by a simple separation means such as evaporation. In one embodiment, the composition comprises the organic liquid.

The compositions of the invention are suitable for preparing mill-bases wherein the particulate solid is milled in an organic liquid in the presence of a compound of Formula RC(=O)-[A]$_m$-[B]$_n$—Z or salts thereof. These millbases can be mixed in precise ratios to form colourants for ceramic articles having specific colour intensity and shade. It is anticipated that colourants for application by ink jet technology will comprise at least 3 and up to 12 different colours that can be ink jetted to form a variety of colours, shades, intensities, etc., on ceramic articles after firing at 600° C. or more.

Typically, the mill-base contains from 20 to 60% by weight particulate solid based on the total weight of the mill-base. In one embodiment, the particulate solid is not less than 10 or not less than 20% by weight of the mill-base. Such mill-bases may optionally contain a binder added either before or after milling.

The amount of dispersant in the mill-base is dependent on the amount of particulate solid but is typically from 0.5 to 12% by weight of the mill-base.

Dispersions and mill-bases made from the composition of the invention are particularly suitable as pigment dispersions for use in solvent-based inks for ceramic articles, especially where the inks are applied from non-aqueous media, and especially ink jet printed ceramic objects that are fired at 600° C. or above to develop the pigment color characteristic such as wall and floor tiles.

This disclosure also includes a process for digitally printing on ceramic article or glass article using an ink jetted through a nozzle;
 a) providing a mixed metal oxide pigment dispersed in an organic medium (fatty acid esters and glycol ether/esters) with a dispersing agent of the formula RC(=O)-[A]$_m$-[B]$_n$—Z    Formula (1)

wherein Formula 1 can be a random or blocky copolymer
 R is a $C_{1-35}$ hydrocarbyl group;
 A is an oxy ($C_{8-20}$) alk(en)ylene repeating unit of a polyester;
 B is an optionally substituted oxy ($C_{2-7}$) alkylene carbonyl repeating unit of a polyester;
 m is 1-6 and n is 1-10 and m+n is from 4 to 16;
 Z is OH or is a group which is attached to the carbonyl group of A or B through an oxygen or nitrogen atom and can be generally represented by the formula:

—N(T)-Q-Y or —O-Q-Y;

wherein T is a hydrogen, or a $C_{1-18}$ hydrocarbyl radical, or a group represented by Q-Y;
 Q is an alkylene or hydroxyalkylene radical containing from 2-6 carbon atoms;
 and Y is a tertiary amine group represented by the formula:

—N(R$^2$)(R$^3$)

or a quaternary ammonium group represented by the formula:

—N$^+$(R$^2$)(R$^3$)(R$^4$)W$^-$ wherein R$^2$, R$^3$ and R$^4$ are each independently optionally substituted alkyl, cycloalkyl, or benzyl groups wherein the alkyl or cycloalkyl group can have from 1 to 18 carbon atoms, optionally hydroxyl or halogen (e.g., Cl, Br, or I) substituted, and wherein R$^2$ and R$^3$ can be a single hydrocarbon group that in combination with the N of the Y group forms a cyclic amine (which can be saturated or unsaturated, e.g. alkylene or aromatic);
 and W$^-$ is a colourless anion;
 b) jetting said mixed metal oxide dispersed in said mid-polar ester medium and/or polar ether medium using said dispersing agent according to a digital image to form an image that develops on said ceramic article or glass article during firing (wherein said ceramic article optionally has one or more pre-glaze layer(s) thereon prior to receiving said digital image);
 c) optionally applying a glaze over said digital image; and
 d) firing said ceramic article or glass article at an elevated temperature to cause said mixed metal oxide to develop its color.

The coatings or inks made from mixed metal oxide dispersions and dispersants of this specification differ from conventional organic binder based coatings and inks in two additional details. In a preferred embodiment the binder (if any) in the coatings and inks of this specification are substantially (e.g. >90 wt. %, >95 wt. %, or >99 wt. % based on the dried and heat treated coating or ink) inorganic material rather than organic material. A second significant difference is that the dispersants of this specification are significantly volatilized or burned away (e.g. >80 wt. %, >90 wt. %, or >99 wt. % of the dispersant is volatilized or burned away based on the weight of the dispersant prior to heat treatment). Thus, in organic binder systems the organic dispersant is retained in the final ink or coating as an interface between the binder and the particulate matter. In the inks and coatings of this specification the dispersant is only present until the heat treatment of the article and the coating or ink to melt and fuse the ink to the ceramic or glass substrate. After the heat treatment the dispersant is substantially burned away or volatilized so that the coating or ink and the particulate (e.g., pigment (mixed metal oxide) or vitreous material of the glaze) is substantially free of any organic dispersant at the interface between the particulate and the inorganic materials of the ceramic or glass.

Ceramic articles will generally mean a variety of useful and decorative items formed from clay and porcelain that develop additional strength from an elevated temperature treatment (such as about 400 to about 1200° C.) that fuses the inorganic material providing additional mechanical strength and resistance to liquids. They include, but are not limited to, tiles in various sizes and shapes, cups, jars, crocks, other storage vessels, bowls, plates, utensils, jewelry, bricks, floor, ceiling, and wall tiles, etc. The ceramic articles can be intended for use inside a dwelling or for exterior use such as in building construction.

Glass articles include functional and decorative glass articles. Glass differs from ceramic in that ceramic is generally translucent at best where glass (unless intensely coloured) is generally transparent in thicknesses of about 0.5 mm such that size ten type can be read through glass panes under normal sunlight conditions. For the purpose of this specification, glass articles will generally have high concentrations of silica (e.g., SiO$_2$) of at least 50% by weight based on the entire glass portion of the article. Examples of glass compositions include lead-oxide glass at 59 wt. % silica, 2 wt. % Na$_2$O, 25 wt. % PbO, 12 wt. % K$_2$O, 0.4 wt. % alumina and 1.5 wt. % Zn; sodium borosilicate glass with about 81 wt. % silica, 12 wt. % B$_2$O$_3$, 4.5 wt. % Na$_2$O, and 2 wt. % Al$_2$O$_3$; soda-lime-silica window glass with about 72 wt. % silica, 14.2 wt. % Na$_2$O, 25 wt. % MgO, 10 wt. %

CaO, and 0.6 wt. % $Al_2O_3$; and fused silica glass with 95+wt. % silica. Glass articles can generally include, but is not limited to, glass panes (including curved and non-flat panes), tubes, vials, bottles, beakers, flasks, glasses, cups, plates, bowls, pans, lenses, vessels, jars, spheres/balls, etc. In the past, screen printing has been used to decorate some glass containers and articles with mixed metal oxide type pigments formed into an inorganic ink. These can somewhat permanently identify the contents with source, content, or trademark identification.

The following examples provide illustrations of the invention. These examples are non-exhaustive and are not intended to limit the scope of the invention.

EXAMPLES

Dispersant Example 1

Preparation of Dispersants

Example 1

Caprolactone (29.3 parts by wt.), ricinoleic acid (229.3 parts) and zirconium butoxide catalyst (0.51 parts) are added to a 500 ml round bottomed flask under a nitrogen atmosphere. The mixture is stirred at 172° C. for 8 hours. An amber liquid is obtained (241 parts) with an acid value of 35.4 mg KOH/g. This is Dispersant 1.

Example 2

Caprolactone (86.8 parts) and ricinoleic acid (226.8 parts) are charged to a 3 necked RB flask and the mixture is stirred at 100° C. under a nitrogen atmosphere. 3-dimethylaminopropylamine (20.5 parts) is added to the mixture which is stirred for 1 hour and then warmed to 120° C. Zirconium butylate catalyst (0.5 parts) is added to the mixture which is stirred at 180° C. for 16 hours under a nitrogen atmosphere. The mixture is allowed to cool to 100° C. and is then poured off into a glass jar to give an amber liquid (300 g). Acid Value=15.8 mg KOH/g, Base eqv=1517. This is Dispersant 2.

Comparative example A is prepared as previously disclosed for dispersant example 12 of U.S. Pat. No. 5,700,395.

Comparative Milling Tests

Pigment Brown 33 Dispersions

Dispersions are prepared by dissolving dispersants (27 parts as 100% active) in Dowanol TPM (ex.Dow) (243 parts). Sicocer F Brown 2726 pigment (ex.BASF) (180 parts) was added to each mixture and each were premixed using a saw tooth impeller at 2000 rpm for 30 minutes.

Each premix was then milled using a Netzsch LAbStar/Mini Mill and a "mini" grinding chamber (0.16 litre) under the following conditions; a 70% bead charge of 0.3-0.4 mm YTZ beads at 4000 rpm, a pump speed of 15 rpm and a mill temperature of 30-40° C.; until a particle size of $D_{50}$ less than 500 nm and a $D_{90}$ of less than 900 nm was achieved. Particles sizes were obtained by taking a sample of the milling dispersion (0.04 parts) and diluting in toluene (8 parts) and measuring the particle size on a Nanotrac DLS particle size analyzer.

TABLE 1

Pigment Brown 33 Dispersions

| Agent | Milling Time minutes | Viscosity cps @30 $s^{-1}$ | Viscosity cps @30 $s^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 90 | 20.5 | 21 | 223/370 | 238/388 |
| Comparative Example A | 90 | 29 | 28.5 | 230/412 | 241/356 |
| Control (No Dispersant) | NA | N/A | N/A | nm | nm |

Control failed and gelled in the milling.

Pigment Yellow 159 Dispersions in Isopropyl Laurate and Isopropyl Myristate mixture Dispersions are prepared by dissolving dispersants (36.05 parts as 100% active) in isopropyl laurate (ex. sigma Aldrich) (151.73 parts) and isopropyl myristate (ex. sigma Aldrich) (61.97 parts). Sicocer Yellow F 2214 pigment (ex. BASF) (200.25 parts) was added to each mixture and each were premixed using a saw tooth impeller at 2000 rpm for 30 min. The premix was then milled using a Netzsch LAbStar/Mini Mill and a "mini" grinding chamber (0.161) under the following conditions; a 87.5% bead charge of 0.3-0.4 mm YTZ® beads at 3000 rpm, a pump speed of 15 rpm and a mill temperature of 20-30° C. for 90 minutes. YTZ® is a trademark of Nikkato Corporation and the grinding media is a joint development of Nikkato Corp. and Tosoh Corp. of Tokyo, Japan. Initial particle sizes and viscosity measurements of the final inks were obtained and these measurements were repeated after the inks were stored for 3 weeks at 40° C. Particles sizes were obtained by taking a sample of the milling dispersion (0.04 parts) and diluting in toluene (8 parts) and measuring the particle size on a Nanotrac DLS particle size analyzer. Viscosity measurements of the final ceramic inks were obtained on a TA Instruments Cone and Plate Rheometer. The final inks (20 ml) were put into a syringe and passed through a 5 micron filter until no ink passed through. The amount of ink which passed through the filter was measured. Amounts greater than 5 mls were deemed acceptable.

TABLE 2

Pigment Sicocer Yellow in Isopropyl Laurate and Isopropyl Myristate mixture Dispersions B

| Agent | Viscosity cps @30 $s^{-1}$ | Viscosity cps @30 $s^{-1}$ (after 3 weeks at 40° C.) | Particle Size nm $D_{50}/D_{90}$ | Particle Size nm $D_{50}/D_{90}$ (after 3 weeks at 40° C.) | Filtration through 5 micron Filter (mls) |
|---|---|---|---|---|---|
| Dispersant Example 1 | 22 | 18 | 288/509 | 262/373 | 8 |
| Dispersant Example 2 | 22 | 19 | 273/483 | 248/362 | 7 |
| Comparative Example A | 29 | 24 | 298/455 | 289/381 | 6 |

Control with no dispersant failed and gelled in the milling.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications, thereof, will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a mid-polar ester medium and/or polar ether medium and a dispersing agent of the Formula (1),

RC(=O)-[A]$_m$-[B]$_n$—Z        Formula (1)

wherein Formula 1 is a random or blocky copolymer of A and B units,

R is a C$_{1-35}$ hydrocarbyl group optionally substituted with hydroxyl or halogen;

A is an oxy (C$_{8-20}$) alk(en)ylene carbonyl repeating unit;

B is an optionally substituted oxy (C$_{2-7}$) alkylene carbonyl repeating unit;

m is 1-6 and n is 1-10 and m+n is from 4 to 16;

Z is OH or is a group which is attached to the carbonyl group of A or B through an oxygen or nitrogen atom and is generally represented by the formula:

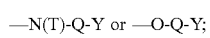

—N(T)-Q-Y or —O-Q-Y;

wherein T is a hydrogen, or a C$_{1-18}$ hydrocarbyl radical, or a group represented by Q-Y;

Q is an alkylene or hydroxyalkylene radical containing from 2-6 carbon atoms;

and Y is a tertiary amine group represented by the formula:

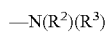

—N(R$^2$)(R$^3$)

or a quaternary ammonium group represented by the formula:

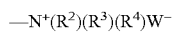

—N$^+$(R$^2$)(R$^3$)(R$^4$)W$^-$ wherein R$^2$, R$^3$ and R$^4$ are each independently alkyl, cycloalkyl, or benzyl groups optionally wherein the alkyl or cycloalkyl group has from 1 to 18 carbon atoms, optionally wherein said alkyl, cycloalkyl, or benzyl are hydroxyl or halogen substituted, and optionally wherein R$^2$ and R$^3$ are a single hydrocarbon group that in combination with the N of the Y group forms a cyclic amine;

and W$^-$ is a colourless anion, and wherein the particulate solid is a mixed metal oxide pigment that develops its color intensity and hue after firing at elevated temperatures.

2. The composition according to claim 1, wherein Z is a hydroxyl group.

3. The composition according to claim 1, wherein Z is represented by —O-Q-Y.

4. The composition according to claim 1, wherein Z is represented by —N(T)-Q-Y.

5. The composition as claimed in claim 1, wherein the particulate solid is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

6. The composition as claimed in claim 5, wherein the mixed metal oxide particulate is present from about 20 to about 60 wt. % of said composition.

7. The composition according to claim 1, wherein Z is represented by —N(T)-Q-Y or —O-Q-Y.

8. The composition according to claim 7, wherein Y is a tertiary amine.

9. The composition according to claim 7, wherein Y is a quaternized amine.

10. A process for milling an inorganic particulate, having a dry powder volume average particle diameter D$_{50}$ in excess of 2 micron, in a mid-polar ester medium and/or polar ether medium to a D$_{50}$ particle size of less than 700 nanometres, said process comprising;

a) blending a mid-polar ester medium and/or polar ether medium, said inorganic particulate material comprising a mixed metal oxide pigment, optionally including a vitreous glaze material, having a dry powder volume average particle diameter in excess of 2 micron, and a dispersing agent of the formula

RC(=O)-[A]$_m$-[B]$_n$—Z        Formula (1)

wherein -[A]$_m$-[B]$_n$— of Formula 1 is a random or blocky polyester copolymer of A and B units, R is a C$_{1-35}$ hydrocarbyl group, optionally substituted with hydroxyl or halogen;

A is an oxy (C$_{8-20}$) alk(en)ylene carbonyl repeating unit;

B is an optionally substituted oxy (C$_{2-7}$) alkylene carbonyl repeating unit;

m is 1-6 and n is 1-10 and m+n is from 4 to 16;

Z is OH or Z is a group which is attached to the carbonyl group of A or B through an oxygen or nitrogen atom and is generally represented by the formula:

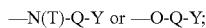

—N(T)-Q-Y or —O-Q-Y;

wherein T is a hydrogen, or a C$_{1-18}$ hydrocarbyl radical, or a group represented by Q-Y;

Q is an alkylene or hydroxyalkylene radical containing from 2-6 carbon atoms;

and Y is a tertiary amine group represented by the formula:

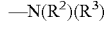

—N(R$^2$)(R$^3$)

or a quaternary ammonium group represented by the formula:

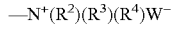

—N$^+$(R$^2$)(R$^3$)(R$^4$)W$^-$ wherein R$^2$, R$^3$ and R$^4$ are each independently alkyl, cycloalkyl, or benzyl groups, optionally wherein the alkyl or cycloalkyl group has from 1 to 18 carbon atoms, optionally wherein said alkyl, cycloalkyl, or benzyl are hydroxyl or halogen (e.g., Cl, Br, or I) substituted, and optionally wherein R$^2$ and R$^3$ are a single hydrocarbon group that in combination with the N of the Y group forms a cyclic amine;

and W$^-$ is a colourless anion, and wherein the particulate solid is a mixed metal oxide pigment that develops its color intensity and hue after firing at elevated temperatures;

b) milling said mixed metal oxide pigment dispersed with said dispersing agent in said mid-polar ester medium and/or polar ether medium using a bead mill for 5 minutes to 60 hours; and c) confirming the volume average particle diameter $D_{50}$ is less than 700 nanometres.

11. The process for milling an inorganic particulate according to claim 10, wherein said milling process is at a milling rate of 0.4 to 8 KWatt/hour per Kg of particulate.

12. The process according to claim 10, wherein said mixed metal oxide pigment contains a combination of two or more different elements in the form of cations selected from the group of Al, Mg, Ca, Cd, Co, Cr, Fe, In, Mn, Ni, Pr, Sb, Se, Si, Sn, Ti, V, Zn and Zr.

13. The process of claim 10, wherein Z is a hydroxyl group.

14. The process of claim 10, wherein Z is represented by —O-Q-Y.

15. The process of claim 14, wherein Y is a quaternized tertiary amine.

16. The process of claim 10, wherein Z is represented by —N(T)-Q-Y or —O-Q-Y.

17. The process of claim 16, wherein Y is a tertiary amine.

18. The process of claim 16, wherein Y is a quaternized tertiary amine.

19. A process for digitally printing on ceramic article or glass article substrate using an ink jetted through a nozzle;

a) providing a mixed metal oxide dispersed in a mid-polar ester medium and/or polar ether medium with a dispersing agent of the formula $$RC(=O)-[A]_m-[B]_n-Z \qquad \text{Formula (1)}$$

wherein Formula 1 is a random or blocky copolymer of A and B units,

R is a $C_{1-35}$ hydrocarbyl group optionally substituted with hydroxyl or halogen;

A is an oxy ($C_{8-20}$) alk(en)ylene carbonyl repeating unit;

B is an optionally substituted oxy ($C_{2-7}$) alkylene carbonyl repeating unit;

m is 1-6 and n is 1-10 and m+n is from 4 to 16;

Z is OH or is a group which is attached to the carbonyl group of A or B through an oxygen or nitrogen atom and is generally represented by the formula:

—N(T)-Q-Y or —O-Q-Y;

wherein T is a hydrogen, or a $C_{1-18}$ hydrocarbyl radical, or a group represented by Q-Y;

Q is an alkylene or hydroxyalkylene radical containing from 2-6 carbon atoms;

and Y is a tertiary amine group represented by the formula:

—N($R^2$)($R^3$)

or a quaternary ammonium group represented by the formula:

—N⁺($R^2$)($R^3$)($R^4$)W⁻ wherein $R^2$, $R^3$ and $R^4$ are each independently alkyl, cycloalkyl, or benzyl groups optionally wherein the alkyl or cycloalkyl group can have from 1 to 18 carbon atoms, optionally wherein said alkyl, cycloalkyl, or benzyl are hydroxyl or halogen (e.g., Cl, Br, or I) substituted, and optionally wherein $R^2$ and $R^3$ are a single hydrocarbon group that in combination with the N of the Y group forms a cyclic amine;

and W⁻ is a colourless anion, and wherein the particulate solid is a mixed metal oxide pigment that develops its color intensity and hue after firing at elevated temperatures;

b) jetting said mixed metal oxide dispersed in said mid-polar ester medium and/or polar ether medium using said dispersing agent onto said substrate to form a pigmented digital image, wherein said pigmented digital image on said substrate develops into a colored image upon firing said ceramic substrate or heating said glass substrate to provide tempering or annealing; and c) optionally applying a glaze over said digital image; and d) heating said ceramic article at an elevated temperature or heating said glass article to anneal or temper it, wherein said image from mixed metal oxide develops optimal color intensity upon heating to its color.

20. The process of claim 19, wherein the mixed metal oxide pigment that develops its color intensity and hue after firing at 600° C. or above for a ceramic substrate or 400° C. or above for a glass substrate.

21. The process of claim 19, wherein said mixed metal oxide is at least one ceramic pigment of mixed metal oxides which contain a combination of two or more elements in cationic form selected from the group of Al, Mg, Ca, Cd, Co, Cr, Fe, In, Mn, Ni, Pr, Sb, Se, Si, Sn, Ti, V, Zn and Zr.

* * * * *